US011500892B1

(12) United States Patent
Orlinsky et al.

(10) Patent No.: US 11,500,892 B1
(45) Date of Patent: Nov. 15, 2022

(54) METHODS, SYSTEM, AND COMPUTER-READABLE MEDIA FOR TRACKING REFERRALS, INTRODUCTIONS, FAVORS, AND OTHER GIVING AMONG A PLURALITY OF PARTIES

(71) Applicant: Treble LLC, Baltimore, MD (US)

(72) Inventors: Eric G. Orlinsky, Baltimore, MD (US); Scott Schelle, Reisterstown, MD (US); Brian Razzaque, Baltimore, MD (US); David Gertler, Ellicott City, MD (US)

(73) Assignee: Treble LLC, Baltimore, MD (US)

( * ) Notice: Subject to any disclaimer, the term of this patent is extended or adjusted under 35 U.S.C. 154(b) by 0 days.

(21) Appl. No.: 16/595,365

(22) Filed: Oct. 7, 2019

Related U.S. Application Data

(63) Continuation-in-part of application No. 14/982,656, filed on Dec. 29, 2015.

(60) Provisional application No. 62/099,198, filed on Jan. 1, 2015.

(51) Int. Cl.
| | | |
|---|---|---|
| *G06F 16/25* | (2019.01) | |
| *G06F 3/0482* | (2013.01) | |
| *G06F 16/9535* | (2019.01) | |
| *G06F 16/248* | (2019.01) | |
| *G06F 16/242* | (2019.01) | |

(52) U.S. Cl.
CPC .......... *G06F 16/252* (2019.01); *G06F 3/0482* (2013.01); *G06F 16/248* (2019.01); *G06F 16/2423* (2019.01); *G06F 16/9535* (2019.01)

(58) Field of Classification Search
CPC ............... G06F 16/252; G06F 16/9535; G06F 16/2423; G06F 3/0482
See application file for complete search history.

(56) References Cited

U.S. PATENT DOCUMENTS

| | | | | |
|---|---|---|---|---|
| 7,912,751 | B1* | 3/2011 | Allos | G06Q 30/02 |
| | | | | 705/14.16 |
| 9,020,965 | B1* | 4/2015 | Sehrer | G06F 16/24578 |
| | | | | 707/758 |
| 2014/0278864 | A1* | 9/2014 | Stanislaw | G06Q 30/0246 |
| | | | | 705/14.16 |
| 2016/0132947 | A1* | 5/2016 | Bollman, IV | H01M 10/441 |
| | | | | 705/26.4 |

* cited by examiner

*Primary Examiner* — Scott C Anderson
(74) *Attorney, Agent, or Firm* — Saul Ewing Arnstein & Lehr LLP; Brian R. Landry

(57) ABSTRACT

One aspect of the invention provides a computer-implemented method of tracking favors between a plurality of parties. The method includes: receiving a submission regarding a favor performed by one or more first parties for one or more second parties; associating the favor with the one or more first parties and the one or more second parties in a database; and providing a user interface programmed to receive instructions from a plurality of users to take one or more or more actions selected from the group consisting of: searching for connections that have granted a particular type of favor in the past, searching for connections that have granted a specified quantity of a particular type of favor in the past, and displaying net flows of favors between a first organization having a plurality of parties and a second organization having a plurality of parties.

1 Claim, 11 Drawing Sheets

FIG. 3

METHODS, SYSTEM, AND COMPUTER-READABLE MEDIA FOR TRACKING REFERRALS, INTRODUCTIONS, FAVORS, AND OTHER GIVING AMONG A PLURALITY OF PARTIES

CROSS-REFERENCE TO RELATED APPLICATIONS

This application is a continuation-in-part under 35 U.S.C. § 121 of U.S. patent application Ser. No. 14/982,656, filed Dec. 29, 2015, which claims priority under 35 U.S.C. § 119(e) to U.S. Provisional Patent Application Ser. No. 62/099,198, filed Jan. 1, 2015. The entire content of this application is hereby incorporated by reference herein.

BACKGROUND OF THE INVENTION

Many businesses rely on referral relationships. For example, lawyers, accountants, and other service providers often refer clients to each other. However, it is difficult to track and quantify the nature of such relationships.

SUMMARY OF THE INVENTION

One aspect of the invention provides a computer-implemented method of tracking favors between a plurality of parties. The method includes: receiving a submission regarding a favor performed by one or more first parties for one or more second parties; associating the favor with the one or more first parties and the one or more second parties in a database; and providing a user interface programmed to receive instructions from a plurality of users to take one or more or more actions selected from the group consisting of: searching for connections that have granted a particular type of favor in the past, searching for connections that have granted a specified quantity of a particular type of favor in the past, and displaying net flows of favors between a first organization having a plurality of parties and a second organization having a plurality of parties.

This aspect of the invention can have a variety of embodiments. The receiving step can be performed in conjunction with creation of a calendar entry. The method can further include prompting one or more of the first parties or the second parties to provide information regarding the favor after conclusion of a calendar entry. The method can further include mining one or more of the first parties' or the second parties' communications to identify the favor. The method can further include prompting one or more of the first parties and the second parties to confirm whether the mined information reflects a favor. The method can further include prompting one or more of the first parties and the second parties to provide additional information regarding the favor. The method can further include sending a communication to the one or more second parties to verify one or more details of the favor.

The one or more actions can include searching for connections that have granted a particular type of favor in the past. The one or more actions can include searching for connections that have granted a specified quantity of a particular type of favor in the past. The one or more actions can include displaying net flows of favors between a first organization having a plurality of parties and a second organization having a plurality of parties.

A time-decay factor can be applied to individual favor values when calculating the net flows.

The net flows of favors can be graphically displayed.

The submission regarding the favor can include information regarding one or more initial introductions between the one or more first parties and the one or more second parties.

The method can further include returning net flows of favors associated with one or more events.

Another aspect of the invention provides a computer-readable medium including computer-readable program code comprising: computer-readable instructions for receiving a submission regarding a favor performed by one or more first parties for one or more second parties; computer-readable instructions for associating the favor with the one or more first parties and the one or more second parties in a database; and computer-readable instructions for providing a user interface programmed to receive instructions from a plurality of users to take one or more or more actions selected from the group consisting of: searching for connections that have granted a particular type of favor in the past, searching for connections that have granted a specified quantity of a particular type of favor in the past, and displaying net flows of favors between a first organization having a plurality of parties and a second organization having a plurality of parties.

Another aspect of the invention provides a computer-implemented method of suggesting connections. The computer-implemented method includes: receiving information from a plurality of users regarding favors performed by or bestowed upon the plurality of users, the information including: a user-defined appraisal of a value of each of the favors; a grantor category describing a grantor of each favor; and a grantee category describing a grantee of each favor; calculating sums of values for each of the grantor categories and the grantee categories for one or more of the users; and identifying one or more users in a different category having a substantially complimentary profile.

Another aspect of the invention provides a computer-implemented method of matching wishes between a plurality of users within a social network. The computer-implemented method includes: receiving one or more electronic submissions from a first user specifying: a career-related wish; a dissemination restriction specifying whether other users or groups of users within the social network should or should not be notified of the career-related wish; and a value associated with the career-related wish; electronically communicating the career-related wish to the other users in accordance with the dissemination restriction in the one or more electronic submissions; sending an electronic communication to the first user inquiring whether the career-related wish was fulfilled and by which fulfilling user; and updating a profile associated with the fulfilling user to increase a virtual currency balance by the value specified by the first user.

This aspect of the invention can have a variety of embodiments. The computer-implemented method can further include applying a decay function to the virtual currency balance over time. The electronically communicating step can be limited to a subset of other users that have previously posted complementary wishes that the first user is capable of fulfilling.

Another aspect of the invention provides a computer-implemented method of displaying a categorical data set including both positive and negative values. The computer-implemented method includes: identifying a negative subset of categories having values less than 0 from the categorical data set; identifying a positive subset of categories having positive values greater than 0 from the categorical data set; and ordering the negative subset by value magnitude; ordering the positive subset by value magnitude; and generating a bar chart; and displaying the bar chart. The negative subset is grouped on a first side of a categorical axis. The positive subset is grouped on a second, opposite side of the categorical axis. The negative subset and the positive subset are depicted in opposite ordering such that a highest-magnitude value for each of the negative subset and the positive subset are adjacent to each other along the categorical axis with decreasing magnitude values when moving toward either edge.

Another aspect of the invention provides a computer-implemented method of displaying a categorical data set including both inflow values and outflow values. The computer-implemented method includes: ordering the inflow values by value magnitude; ordering the outflow values by value magnitude; generating a bar chart; and displaying the bar chart. The inflow values are grouped on a first side of a categorical axis. The outflow values are grouped on a second, opposite side of the categorical axis. The inflow values and the outflow values are depicted in opposite ordering such that a highest-magnitude value for each of the inflow values and the outflow values are adjacent to each other along the categorical axis with decreasing magnitude values when moving toward either edge.

Another aspect of the invention provides a computer-implemented method of identifying a best path for an introduction between a first user and a second user that are not connected to each other within a social networking service. The computer-implemented method includes: identifying a plurality of paths from the first user to the second user via one or more intermediate users; for each of the plurality of paths, identifying each link within the path; summing a referral likelihood score (RLS) for each link along the path; identifying a path having a most-extreme RLS sum among the plurality of paths; and controlling a graphical user interface to present the path having the most-extreme RLS sum to the first user.

This aspect of the invention can have a variety of embodiments. The most-extreme RLS sum can be a highest sum. The most-extreme RLS sum can be a lowest sum. The RLS can be a weighted sum including: a downstream user's rating of an upstream user; a giving score representing a number of favors given by the upstream user to the downstream user; and a receiving score representing a number of favors given by the downstream user to the upstream user. The giving score can be weighted more heavily than the receiving score. The downstream user's rating of the upstream user can be weighted more heavily than either the giving score or the receiving score.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIG. 3 depicts a dashboard graphic user interface (GUI) according to an embodiment of the invention.

Referring now to FIG. 7B, the upper left panel is a line graph depicting the number of referrals, introductions, and wishes for the organization's members over time. The upper right panel is a histogram of ratings of other users. The lower left panel is a line graph of the number of connected members by month. The lower right panel is a bar graph depicts the types of wishes submitted and fulfilled by users.

DEFINITIONS

The instant invention is most clearly understood with reference to the following definitions:

As used herein, the singular forms "a," "an," and "the" include plural references unless the context clearly dictates otherwise.

As used in the specification and claims, the terms "comprises," "comprising," "containing," "having," and the like can have the meaning ascribed to them in U.S. patent law and can mean "includes," "including," and the like.

As used in the specification and claims, the term "favor" includes referrals, introductions, and other acts of giving.

Unless specifically stated or obvious from context, the term "or," as used herein, is understood to be inclusive.

DETAILED DESCRIPTION OF THE INVENTION

Exemplary Network Topology

Figure 1:
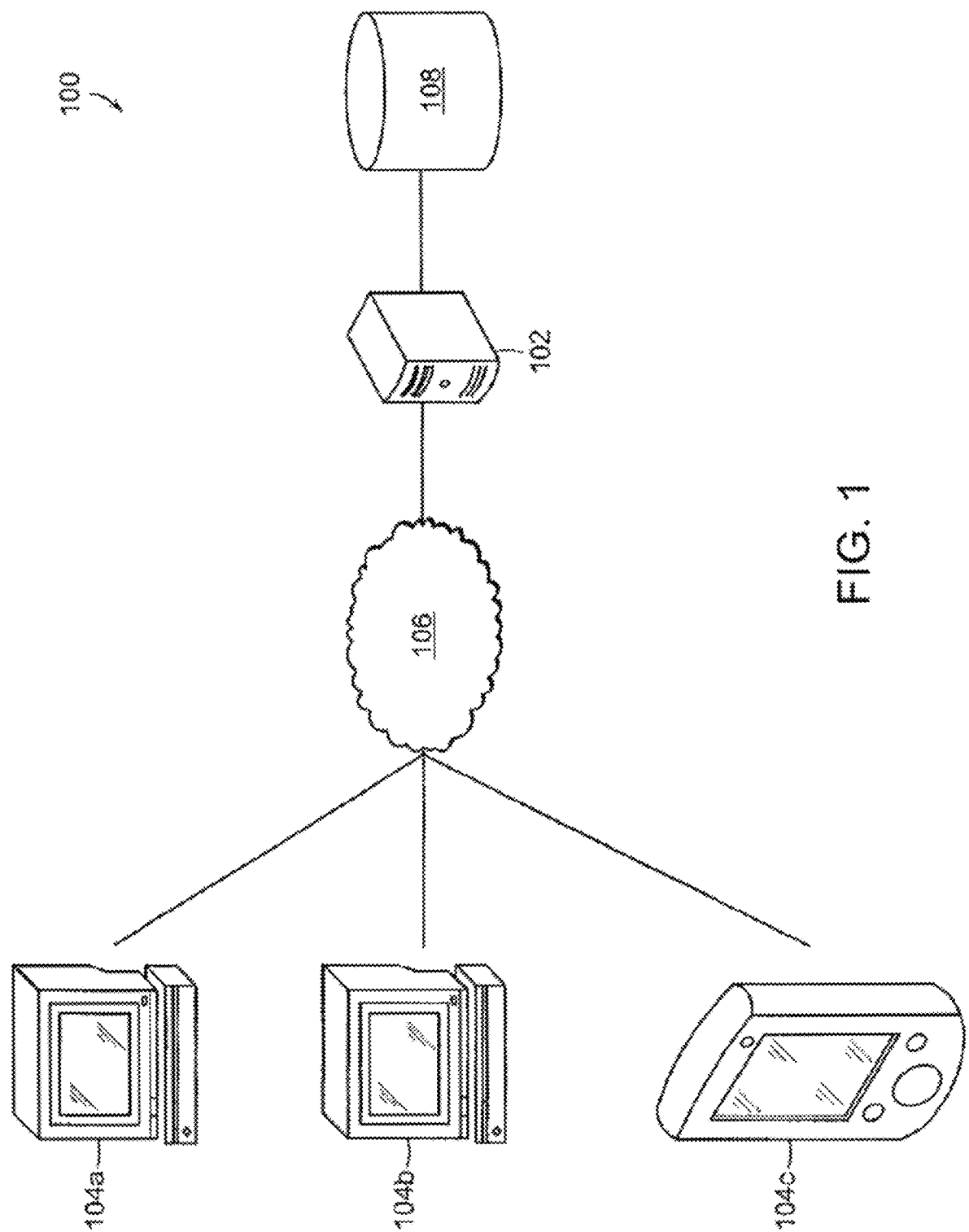
FIG. 1 depicts an exemplary network topology according to an embodiment of the invention.

Referring to FIG. 1, an exemplary network topology 100 for an embodiment of the invention described herein is depicted. Embodiments of the invention can be implemented on server 102, which is in communication with clients 104a-c via network 106.

The terms "client" and "server" are used to reflect a client-server relationship between elements 102 and 104a-104c. Suitable devices for server element 102 include, but are not limited to general-purpose computers, including, but not limited to computers with higher processing power colloquially known as "servers." Likewise, suitable devices for client elements 104a-104c include, but are not limited to general purpose computers, including, but not limited to desktop computers, laptop computers, tablet computers, personal digital assistants, cellular telephones, smartphones, video game systems, digital video recorders (DVRs), and the like.

Network 106 can be any network capable of transmitting data between clients 104a-104c and server 102, for example, an intranet or the Internet.

The server 102 can be in communication with a database 108. Database 108 can be operated through a database management system (DBMS). A DBMS is imposed upon the data to form a logical and structured organization of the data. A DBMS lies between the physical storage of data and the users and handles the interaction between the two. Examples of DBMSes include DB2® and INFORMIX®, both available from IBM Corp. of Armonk, N.Y.; MICROSOFT EXCEL®, MICROSOFT JET®, and MICROSOFT SQL SERVER®, all available from the Microsoft Corp. of Redmond, Wash.; MYSQL®, available from the MySQL Ltd. Co. of Stockholm, Sweden; ORACLE® Database, available from Oracle Intl Corp. of Redwood City, Calif.; and SYBASE®, available from Sybase, Inc. of Dublin, Calif.

Depending on the particular implementation, server 102 and/or clients 104a-c can be programmed to generate and/or display one or more graphical user interfaces that allow users to interact with the server 104 through graphical icons and visual indicators. For example, server 102 and/or clients 104a-c can include charts or graphs (e.g., pie charts, bar charts, line charts, social network graphs, collaboration graphs, and the like) that can be generated on the fly using widgets such as the GOOGLE® CHART API available from Google Inc. of Mountain View, Calif., the CorePlot, iOSPlot, iOS:Chart, KeepEdge Library, and Shinobi Controls graphing libraries for the IOS® operating system from Apple Inc. of Cupertino, Calif., and the GraphView and AndroidPlot libraries for the ANDROID™ operating system from Google Inc. of Mountain View, Calif.

For example, server 102 and/or clients 104a-c can be programmed to generate and display a social network graph depicting one or more paths by which the user could be introduced to another user of interest. The links between nodes representing other users can be color-coded (e.g., using a red, yellow, green scale) based on the number and/or value of favors historically provided by and among and/or the number and/or frequency of communications among the intermediate nodes. For example, a longer path (in terms of number of links) could be depicted as more promising (e.g., by depiction in the color green) based on higher value favors and/or more frequent communications between nodes along the longer path.

Method for Tracking Favors Between Parties

Figure 2:
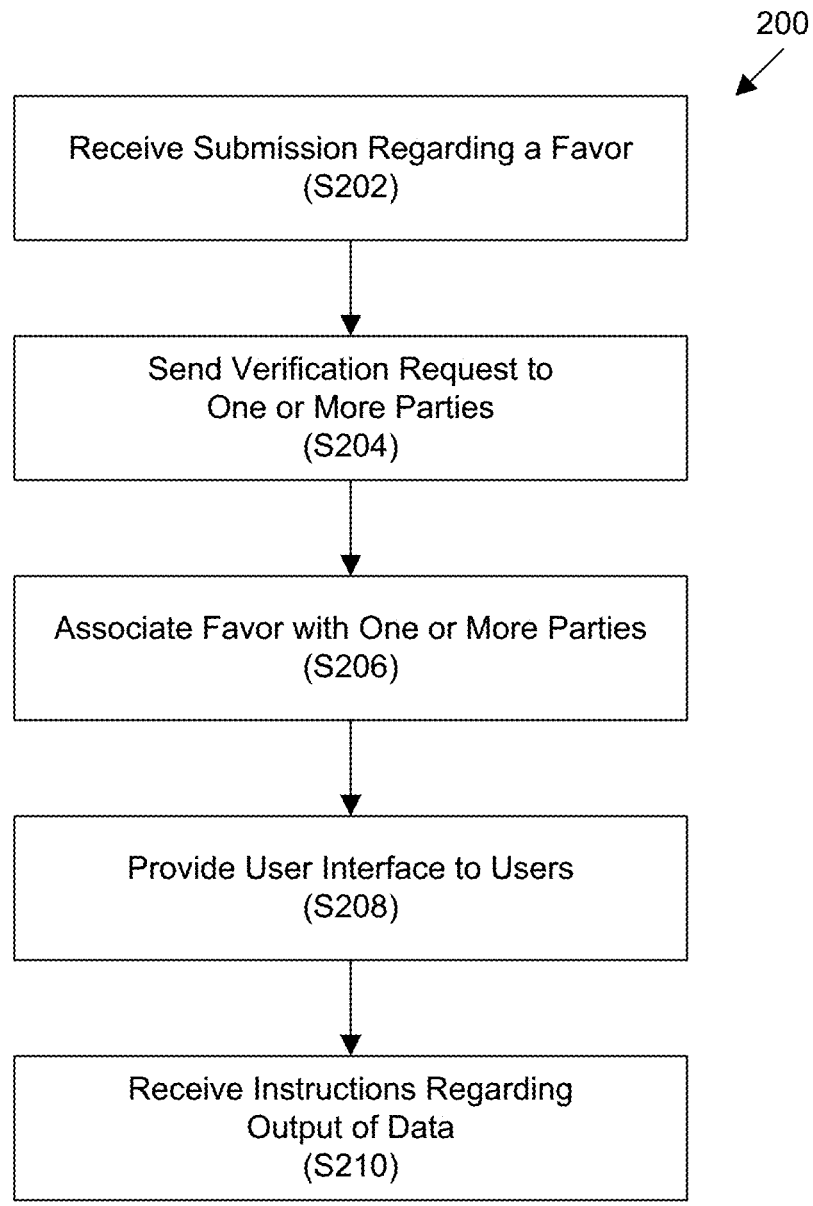
FIG. 2 depicts a method of tracking favors between a plurality of parties according to an embodiment of the invention.

Referring now to FIG. 2, one aspect of the invention provides a method 200 for tracking favors between a plurality of parties.

In step S202, a submission regarding a favor (typically based on an existing real-life relationship between the parties) performed by one or more first parties for one or more second parties is received. The submission can be received at a computer (e.g., server 102) programmed to receive and/or process such a submission. The submission can be in various electronic, computer-readable formats that can be parsed by the receiving computer. For example, the submission can be generated in a HyperText Markup Language (HTML) form or other graphical user interface or element/widget thereof. The substance of the submission can be transmitted in a structured format such as Extensible Markup Language (XML). In some embodiments, the submission can be via e-mail, text message (e.g., SMS), social messaging post (e.g., to the FACEBOOK® platform available from Facebook, Inc. of Menlo Park, Calif., the LINKEDIN® platform available from LinkedIn Corporation of Mountain View, Californian, or the TWITTER® platform available from Twitter Inc. of San Francisco, Calif.), and the like.

The submission can include information about the favor such as the parties involved, a date/time, a description, a value, a category, and the like. In one embodiment, the information further includes information about the origin of the initial introduction(s) resulting in the favor. For example, a party may note that she initially met a referral source at a conference or other event. Logging of this information can allow the user and/or the user's employer to better assess the return on investment for conference attendance.

The user can value a favor in financial terms (e.g., in U.S. dollars or other currencies), using another numeric scale (e.g., assigning a value between 0 and 10 or 0 and 100), assigning ordinal labels (e.g., dirt, lead, tin, bronze, silver, gold, platinum, in order of increasing value), and the like.

Embodiments of the invention can be applied to any type of favor, whether personal or professional. Examples of professional favors include referring work to a service provider, making an introduction, providing subject matter expertise, and the like.

Submissions regarding a favor in step S202 can be generated on a user's initiative or can be suggested or solicited by one or more software programs.

In some embodiments, one or more users are prompted to indicate whether a favor was performed. For example, if a user creates a calendar entry (e.g., in a personal information manager application such as MICROSOFT® OUTLOOK® available from Microsoft Corporation of Redmond, Wash.), the user can be prompted to indicate if a favor was associated with the event (e.g., a referral made over a breakfast meeting). Additionally or alternatively, the user can be prompted after a calendared event to indicate whether any favors were performed and, if so, provide information regarding the same. In other embodiments, the user's e-mail or other communications can be mined for words associated with referrals such as recommend*, introduc*, and the like (* denotes wildcard or truncation searching of all variations of the base word).

In step S204, a verification request can be sent to one or more of the parties. For example, if a first party indicates that it made a referral valued at $50,000 to a second party, an e-mail can be sent to the second party requesting verification of this favor. The second party can reject the favor as erroneous or can modify or propose modifications to the favor (e.g., by indicating an lower or higher value). In some embodiments, if the one or more parties does not respond within a set time period, the favor will be deemed to be accepted.

Although the examples of the inventions described herein ascribe monetary value to favors, the assigned value could also be expressed in terms of any other scale. For example, users could value favors on a numerical scale that is not associated with any real-world currency. For example, users can be asked to rate the value of a favor based on a 0-10 or 0-100 scale. In some embodiments, the assigned value can be negative if the favor was deleterious (e.g., a referral that was obviously ill-suited to the recipient).

In step S206, the favor is associated with the one or more first parties and the one or more second parties in a database. The association can be made through a new record in the database including one or more keys for the first parties, one or more keys for the second parties, and information about the favor. Information about the favor can include a date/time, a description, a value, a category, and the like. For example, a submission can indicate that Accountant A referred corporate legal work valued at $10,000 to Attorney B on Jul. 1, 2014.

The parties can be identified based on information provided in the submission (e.g., e-mail addresses), information previously submitted by the party to the service, and/or by information previously provided to a social network such as the FACEBOOK®, LINKEDIN®, or TWITTER® platforms.

In steps S208 and S210, a user interface is provided to receive instructions from a plurality of users to take one or more actions with regard to previously-submitted data.

For example, a user can view his or her network of relationships sorted or grouped by net inflows and outflows of favors.

In one example, a user can search for connections that have granted a particular type of favor in the past. For example, an accountant can search for connections that have previously referred accounting work (whether to the particular accountant, others in a particular accounting firm, or to other accountants generally). A user can impose certain thresholds or filters on the requested data (e.g., connections that made more than five referrals for accounting work, connections that made referrals within a category exceeding a certain monetary value, connections with a minimum number of interactions or communications within the last year), temporal limitations such as referrals made within the last year or two, and the like) and/or can rank the requested data (e.g., by quantity of favors, aggregate or average value of favors, frequency of communications, and the like). In addition to numerical rankings, the user can also view favors by category (e.g., how many favors a law firm grants to accountants as a category and investment bankers as a category).

In some embodiments, information regarding a specific favor or net favor flows can be modified or skewed by a time-decay factor that decreases the value of older favors.

In another example, the user can display net flows of favors between a first firm or organization having a plurality of parties and a second firm or organization having a plurality of parties. For example, a law firm can review to which accounting firms its attorneys collectively refer clients or from whom they receive referrals for new clients. Such information can leveraged to identify potential collaboration partners, evaluate the reciprocity of arrangements, and the like.

In still another example, a user or organization can request one or more graphical representations of favor inflows and outflows. For example, an organization can visualize which employees are granting the most favors to parties inside and outside of the organization. In this manner, embodiments of the invention can be utilized not only for business development purposes, but also for human resources purposes. For example, a human resources department can more efficiently identify which employees frequently respond to requests for assistance or advice. Users can obtain a "giving" score that allows the user to track how much she is giving back within her network and/or a "net giving" score that measures how much the user gives to her network less the value of favors received. Users could track and seek to grow these scores and could use these scores to promote engagement within one's network and/or provide objective evidence of engagement when seeking a new position.

In yet another example, embodiments of the invention can provide a matchmaking algorithm for suggesting individuals and/or organizations having complimentary or substantially complimentary favor profiles. The matching algorithm can be based on a number of rules.

For example, parties can be matched based on the number or value of favors given to a particular category of service provider, e.g., an attorney that made $50,000 in accounting referrals in the last year might wish to network with an accountant that made $50,000 in legal referrals in the last year.

In another example, Charlie makes several referrals to one or more corporate lawyers in Baltimore that specialize in mergers and acquisition (M&A) work. Eric does not know Charlie, but Eric's profile matches the profiles of the people to which Charlie currently refers M&A business. The platform can be programmed to suggest that Eric should build a relationship with Charlie to try to earn Charlie's future referrals.

Matching can also be facilitated or augmented by one or more ontologies that map meaning onto user posts. For example, commercially available ontologies can create an association between terms such as "lawyer", "attorney", "litigator", "patent prosecutor", and the like such that embodiments of the invention consider the terms to be related and/or equivalent. Such terms can be extracted from the post using software or identified (e.g., by the posting user, another user, and/or an administrator) and denoted with "tags". Similar information can also be extracted from the industr(ies) and/or organization(s) identified by the users' profiles. In another example, a first user seeking "funding" for a start-up can be matched with a second user seeking "investment opportunities".

Likewise, the algorithm can also consider vicinity of the users. For example, commercially available services provide distances between ZIP codes as well as a list of all ZIP codes within a defined radius of a ZIP code, and the like.

A plurality of similarities can be combined to match individuals that may be relatively more relevant to each other. For example, matches can be recommended if two individuals share at least a pre-defined number (e.g., 2) of interests (e.g., geography, industries, and the like) or if they share a defined combination of interests (e.g., similar geography AND similar industry).

Information regarding granted favors can also be mined for use as a proxy of influence or social capital. For example, a retailer may wish to allow a party that frequently grants favors to others to use a product (e.g., a car) that the retailer would like to promote.

A party's network or connections can be based in whole or in part on information previously provided by the user to a social network such as the FACEBOOK®, LINKEDIN®, or TWITTER® platforms. For example, a request for information regarding connections that grant a particular type of favor can query a user's first, second, and third degree connections on the LINKEDIN® platform.

Embodiments of the invention can be further integrated with a social networking platform such as LINKEDIN®. For example, embodiments of the invention can present links to profiles of a particular party, information about how the user is connected to the party through LINKEDIN® contacts, links to request introductions to a party from other LINKEDIN® contacts, and the like. In one embodiment, information about favors granted by a user can be processed to generate one or more numerical scores (e.g., total giving or net giving as discussed herein) that can be displayed on a user's social networking profile.

Embodiments of the invention can additionally or alternatively be integrated with other electronic platforms such as customer relationship management (CRM) system such as SALESFORCE.COM® available from Salesforce.com of San Francisco, Calif., SIEBEL® available from Oracle Corporation of San Mateo, Calif., and SAP® available from SAP SE of Weinheim, Germany, or OUTLOOK®, and the like.

Embodiments of the invention can additionally or alternatively be integrated with other electronic platforms such as e-mail services such as GMAIL® available from Google Inc. of Mountain View, Calif., personal information managers such as OUTLOOK®, and cloud storage services such as ICLOUD® available from Apple Inc. of Cupertino, Calif. For example, embodiments of the invention access e-mails, calendar entries, contacts, and the like.

Embodiments of the invention can utilize a so-called "freemium" model in which users can register and record favors for free, but also purchase or license certain levels of analytical information. Embodiments of the invention can utilize a so-called "enterprise" version designed to address organizational needs (e.g., viewing of net inflows and outflows at an organizational level, viewing of inflows and outflows within the organization, and the like).

Tracking of Interactions

As discussed herein, embodiments of the invention can additionally or alternatively track interactions between a plurality of users. Although favors will almost always be associated with a transaction (e.g., an introduction via e-mail), tracking interactions can provide more data points regarding relationships. Examples of interactions include, but are not limited to, personal interactions, meetings, telephone calls, correspondence, e-mails, electronic messages, and the like. Interactions can be tracked based on information provided by a user and/or can be automatically collected (e.g., based on software integrated with one or more communications systems (e.g., a firm's e-mail system).

Wish Engine

Another embodiment of the invention enables a party to post a business wish (e.g., a business, professional, or career objective, such as a new client, deal, customer, speaking engagement, job, candidate, board appointment, career advice, internship, mentor, business connection, special event, purpose/cause or other business need) and share that wish selectively within the party's trusted network, alumni or business organization, their network's connections, or an entire business community.

Figure 5:
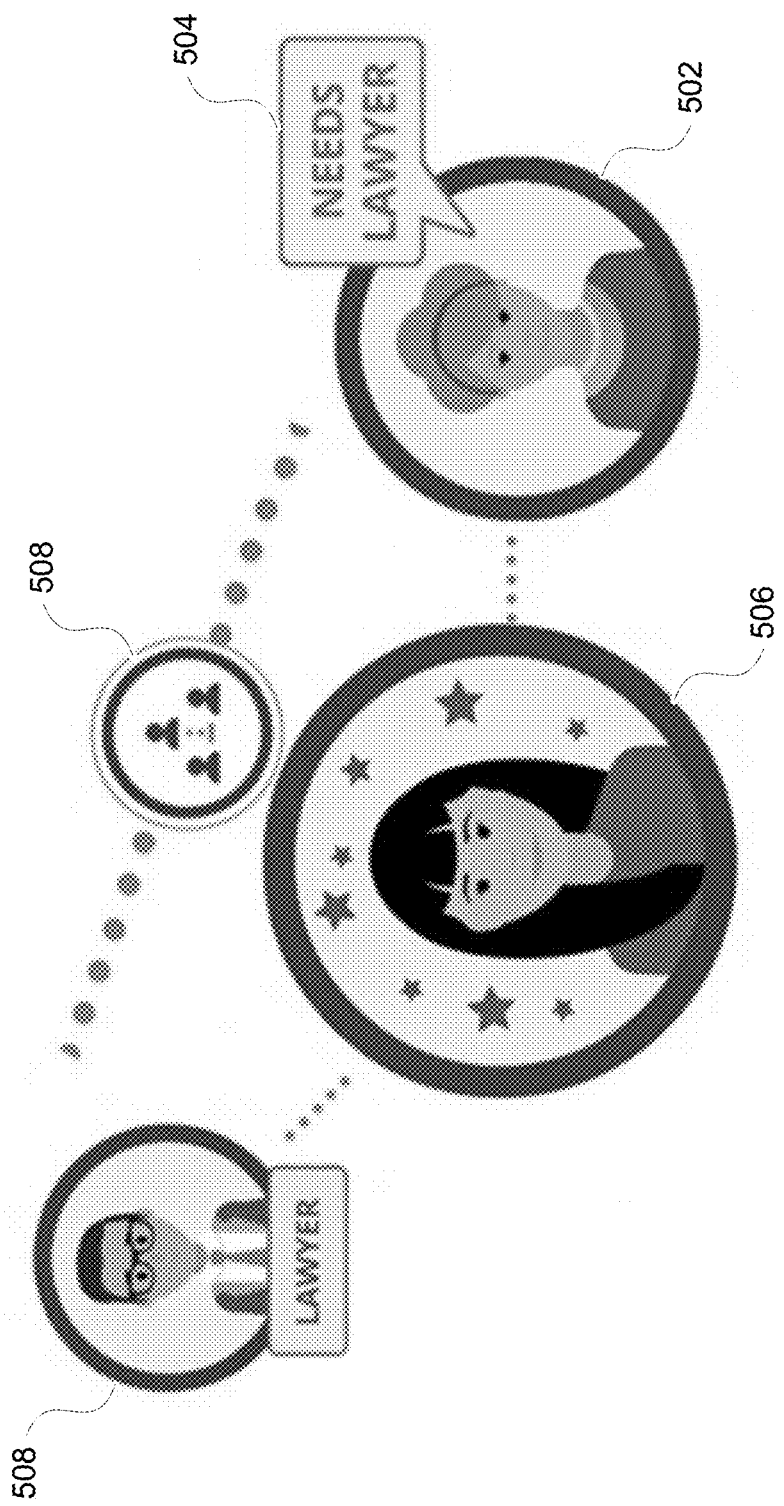
FIG. 5 depicts operation of a "wish engine" to process a referral request according to an embodiment of the invention.

Other parties can view posted wishes shared with them via the network and can communicate (e.g., electronically) with the posting party regarding the wish. Other parties can also forward the wish (e.g., as an introduction, referral, and the like) to third parties that may be able to assist the posting party. For example and as depicted in FIG. 5, if a first user 502 posts a wish 504 indicating that she needs a lawyer, a second user 506 can generate a referral 508 to a third user 510 that is a lawyer.

The posting party can set one or more restrictions on dissemination of the wish. For example, the posting party can restrict dissemination by industry, geography, or other parameters of the posting party's choice to make it more relevant to the receiving parties and/or to protect the posting party's privacy (e.g., when networking for new positions).

The posting party can also assign points to indicate the relative importance of that wish. Embodiments of the invention can generate and/or process notices to the posting party if/when someone offers to help and enables posting party to indicate if the other party's offer was successful and how much value was provided.

When a user creates a wish, the user can choose a category (e.g., "Job" or "Business Opportunity"). The category can be associated with a "direction". For example, if the category is JOB, the user interface can be controlled to ask the user whether (a) "you are looking to HIRE" or (b) "you are looking TO BE HIRED".

The Wish Matching algorithm can identify for "complementary wishes", e.g., wishes that match the category, but are opposite in direction and have overlap in the geography and industry filters. For example, Eric posts a wish: looking for a JOB (category JOB, direction CANDIDATE) in BALTIMORE in the LEGAL profession. David posts a wish: looking to hire (category JOB, direction HIRING) in BALTIMORE in the LEGAL profession. These wishes would be considered complementary. The Wish Matching algorithm can then suggest to Eric and David that they should reach out to the other person.

If Eric or David limit the visibility of their wish, the algorithm will not make the match unless each user is within the defined visibility of each other's wish. For example, if Eric makes the wish visible ONLY to his golfing buddies (e.g., users that he tagged as "golfing buddies") or users that are also in an organization of which he is a member, and David falls into neither of these categories, then David and Eric's wishes will not match.

Wish visibility can be governed by three mechanisms. First, a user can create tags and apply them to people she knows and use any grouping of these tags. Second, a user can choose to let the wish be visible only to those she is directly connected to, "friends of friends", or everyone on the platform. Third, a user can share wishes with members of organizations of which she is a validated member (e.g., through the platform).

If a user specifies a set of geographies such as New York, Boston, and Baltimore, and there is at least one match with another user's complementary wish, then there will be a match. For example, if Eric is looking for a job in New York, Boston, or Baltimore and David is looking to hire in Baltimore, Detroit and Chicago, there is one overlapping city/area and the system can alert Eric and David that they should reach out to each other.

Matching can additionally or alternatively be based on imbalances between users that have previously interacted. For example, if David has performed 16 favors (e.g., referrals, introductions, wish fulfillments, and the like) for Eric and has performed 24 favors for David, the net imbalance can be 8 and the system can compare that to other imbalances that David has with other users and suggest that he help Eric.

Artificial Intelligence Engine

Embodiments of the invention guide parties to be more effective business networkers.

For example, an embodiment of the invention can implement algorithms that identify and notify a party if another party has posted a "complementary wish" and suggest that one party should reach out to the other party to see if they can help each other.

Another embodiment of the invention can identify and suggest people whom a first party should meet based on one or more of the first party's: industry, geography, interests, or any combination thereof. For example, an embodiment of the invention can suggest parties based on a highest number of mutual interests.

Still another embodiment of the invention can provide an algorithm that will suggest that a first party meet someone who is likely to be offering the type of business with which the first party is likely to be interested (e.g., based on expressed wishes, identified wishes, or the quality and/or quantity of referrals provided by the second party).

For example, the platform can periodically (e.g., each day, each week, and the like) perform calculations to update the "referral likelihood score" (RLS) for each pair of users (e.g., connected users). This "best path" can be graphically displayed as a button or other GUI element or widget found on a user's profile to which a first user is not yet connected. The button can be greyed-out for "Free" users. "Premium" members can be able to compute the "best path" between themselves and a first defined number (e.g., N+1 connections as discussed further below). An "Ultra Premium" member can be able to see the best path for anyone in the system.

Figure 9:
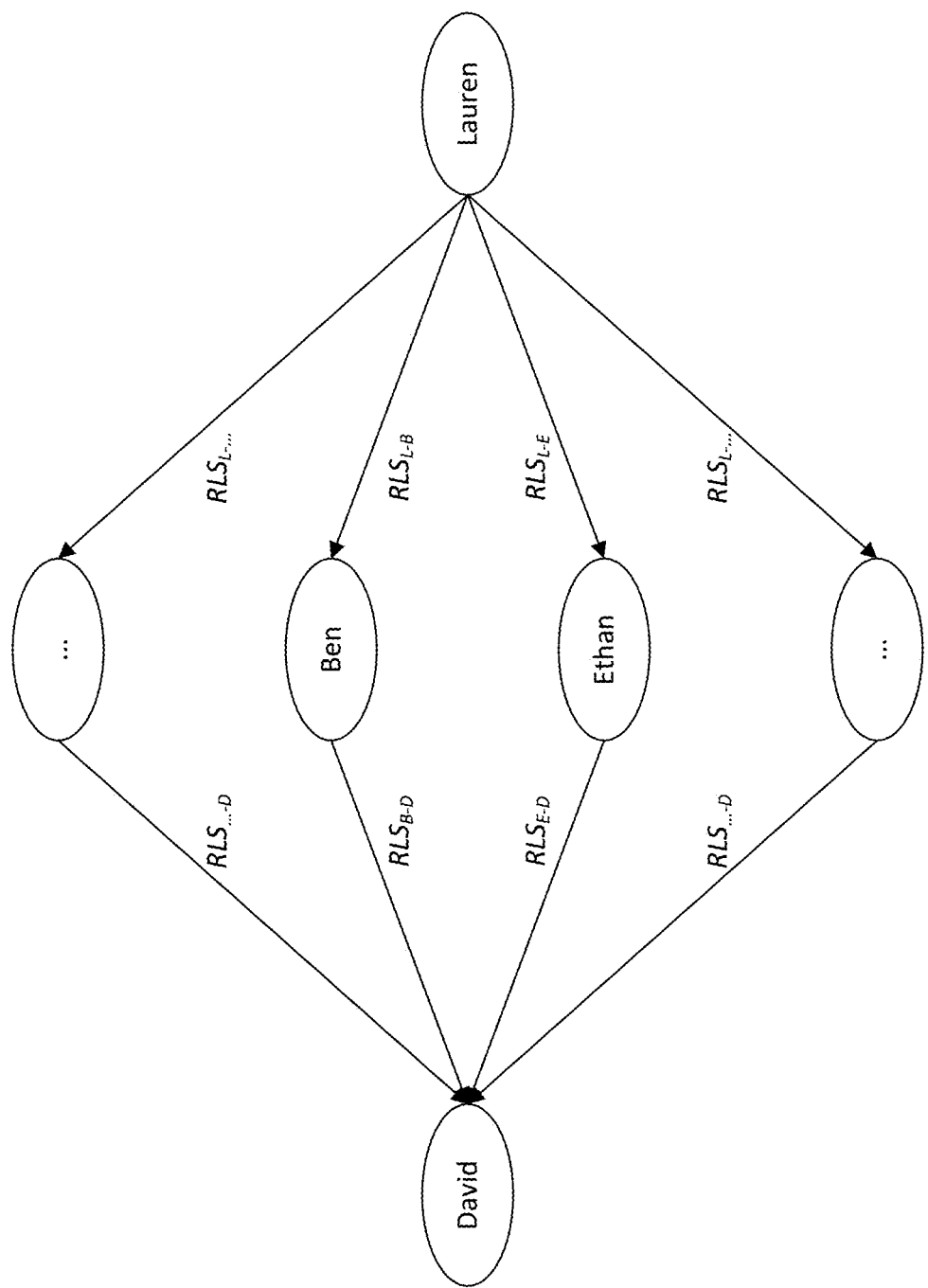
FIG. 9 depicts a method of identifying a best path for an introduction between a first user and a second user that are not connected to each other within a social networking service according to an embodiment of the invention.

The algorithm can rank each connection who has a connection to the targeted person by their "referral likelihood score". For example and referring to FIG. 9, assume David wants to meet Lauren and both Ethan and Ben are mutual connections (i.e., they both know David and Lauren). Embodiments of the system can utilize three factors to determine Ethan and Ben's "referral likelihood score". A "ratings" factor (x) considers how Lauren rates Ben, how Lauren rates Ethan, how Ben rates David, and how Ethan rates David, and the like. An "introductions and referrals received" factor (y) considers the number of introductions and referrals received, e.g., how many introductions and/or referrals has Lauren received from Ben and Ethan. An "introductions and referrals given" factor (z) considers how many introductions and/or referrals has Lauren given Ben and Ethan.

For each pairing, the platform can calculate a "referral likelihood score" (RLS) using an equation such as:

$$RLS = ax + by + cz$$

In one embodiment, the weightings 15, 3, and 1 are used, respectively for a, b, and c, yielding:

$$RLS = 15x + 3y + 1z$$

Thus, if Lauren gives Ben a 2-star rating, Ben gave Lauren 15 introductions/referrals, and Lauren gave Ben 3 introductions/referrals:

$$RFS_{Lauren-Ben} = (15 \times 2) + (3 \times 15) + (1 \times 3) = 78$$

An RLS can be calculated for each connection pair. Then, the scores can be summed over a plurality of paths. The length of each path can be uniform (e.g., all paths having two links can be compared). Additionally or alternatively, the sum can be divided by the length of the path in order to normalize the sum and avoid a bias towards longer paths that may have a larger sum due to the larger quantity of summands. Continuing the example above, the best path for David to be introduced to Lauren is the greater of $(RLS_{Lauren-Ben} + RLS_{Ben-David})$ and $(RLS_{Lauren-Ethan} + RLS_{Ethan-David})$.

Scoring Engine

Further embodiments of the invention can provide algorithms that score each user based on their networking activities and how others view that user. Networking activities that feed into the algorithm can include: giving/receiving introductions and referrals, attempting to fulfill the other user's wishes, and using the platform to help themselves. Without being bound by theory, Applicant believes that the individual user's score is a proxy for the goodwill he/she is creating.

In one embodiment, the algorithm implements a "decay" factor in which the user's score will decrease over time (e.g., linearly, exponentially, and the like). The "decay" factor represents the notion that goodwill decays over time (e.g., "What have you done for me lately?"), which suggests the best way to maintain a high score is to network and help others frequently (rather than only when you lose a job or suddenly need something). In some embodiments, the time decay can be initiated in response to an event such as failing to maintain a certain level of activity within the platform. Decay can be performed at an individual time for each user (e.g., at a defined interval from a triggering event) or can be batched (e.g., decay is applied to all affected users at the same time every n weeks, n months, etc.)

Embodiments of the invention can also calculate an individual score and a network score that shows the relative value of the strength of a user's network.

Gamification

Embodiments of the invention can implement algorithms that leverage data generated through interactions with the software platform to "gamify" the user experience to incent interactions with other users. For example, users can earn points, badges, or other virtual currency for posting wishes, assisting other users, and the like. These points and analogs can be tracked and displayed on various leaderboards, reports, and the like. Gamification and reinforcement using incentives in this way may increase user engagement and persistence with the system and improve user outcomes.

Display of Greatest Impacts

Figure 6:
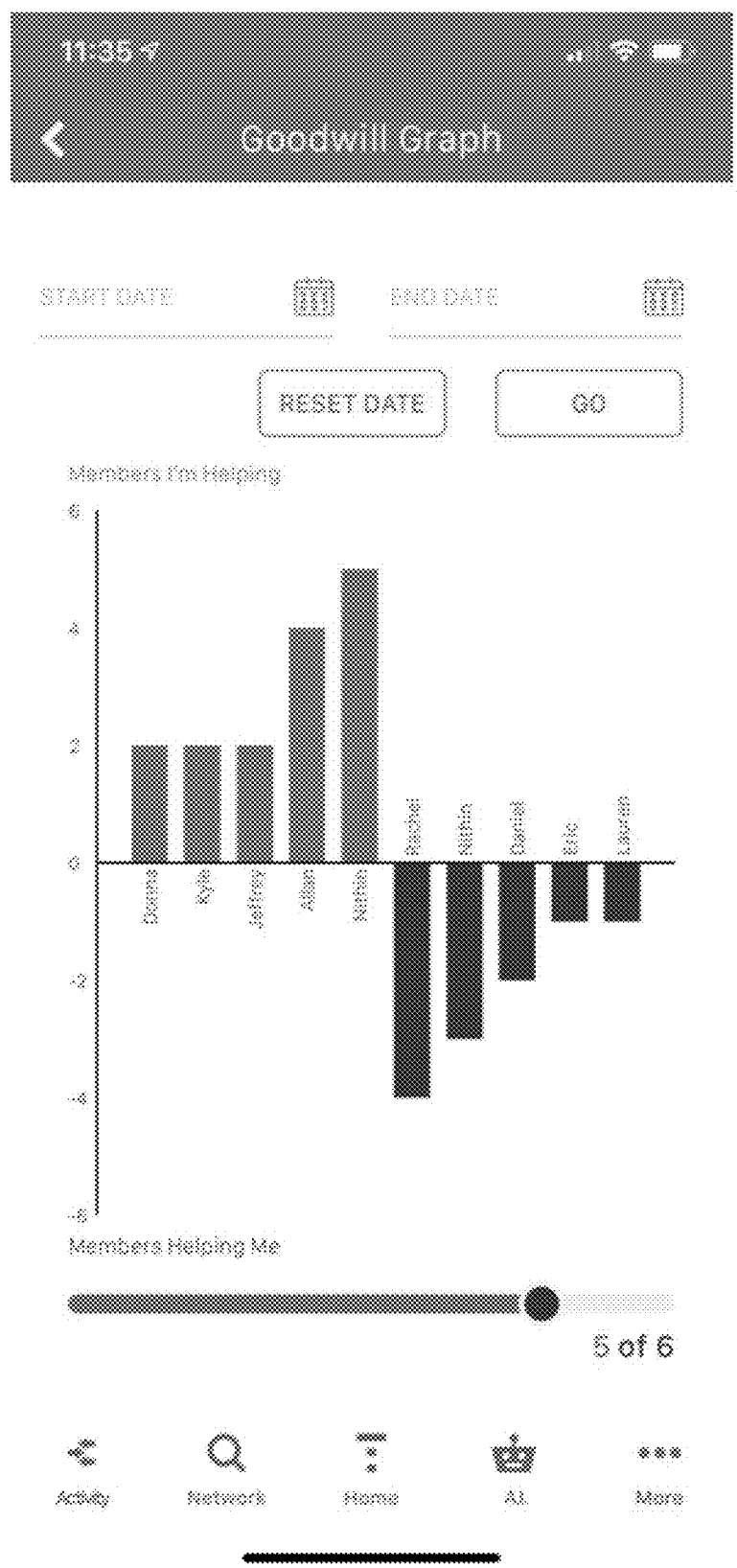
FIG. 6 depicts a bar graph displaying which users a particular user have been most helpful to or received the most help from the particular user over a defined time period according to an embodiment.
Figure 7A:
FIGS. 7A and 7B are two overlapping screenshots depicting an organizational dashboard according to an embodiment of the invention. The organization dashboard provides a summary of the platform's value to an organization's members, which may substantiate the organization's continued subscription to the platform and can be utilized by the organization to justify the organization's member dues. The top portion of FIG. 7A provides a number of members and candidates using the platform as well as user activity over a selectable period.
Figure 7B:
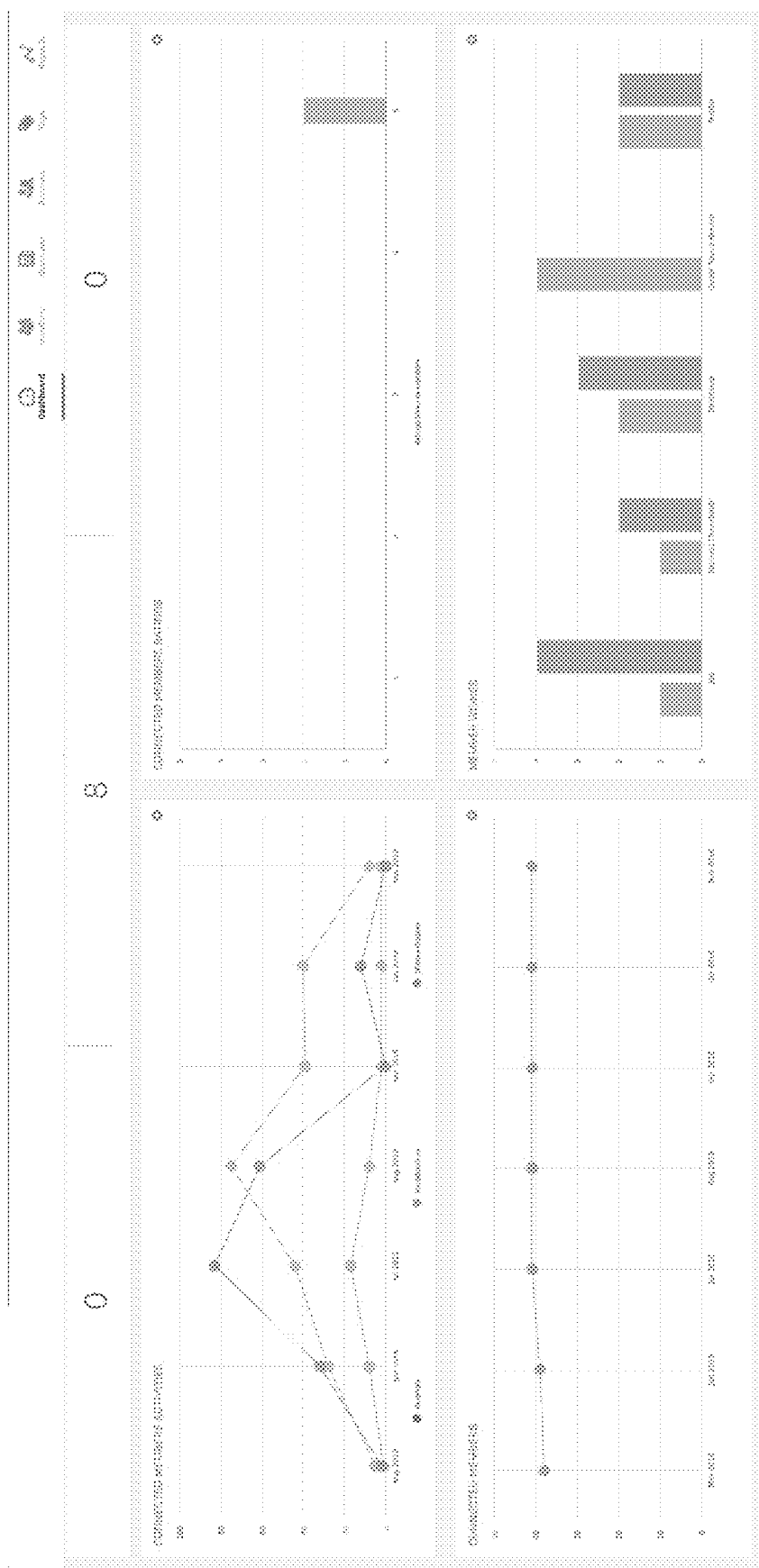
Figure 8:
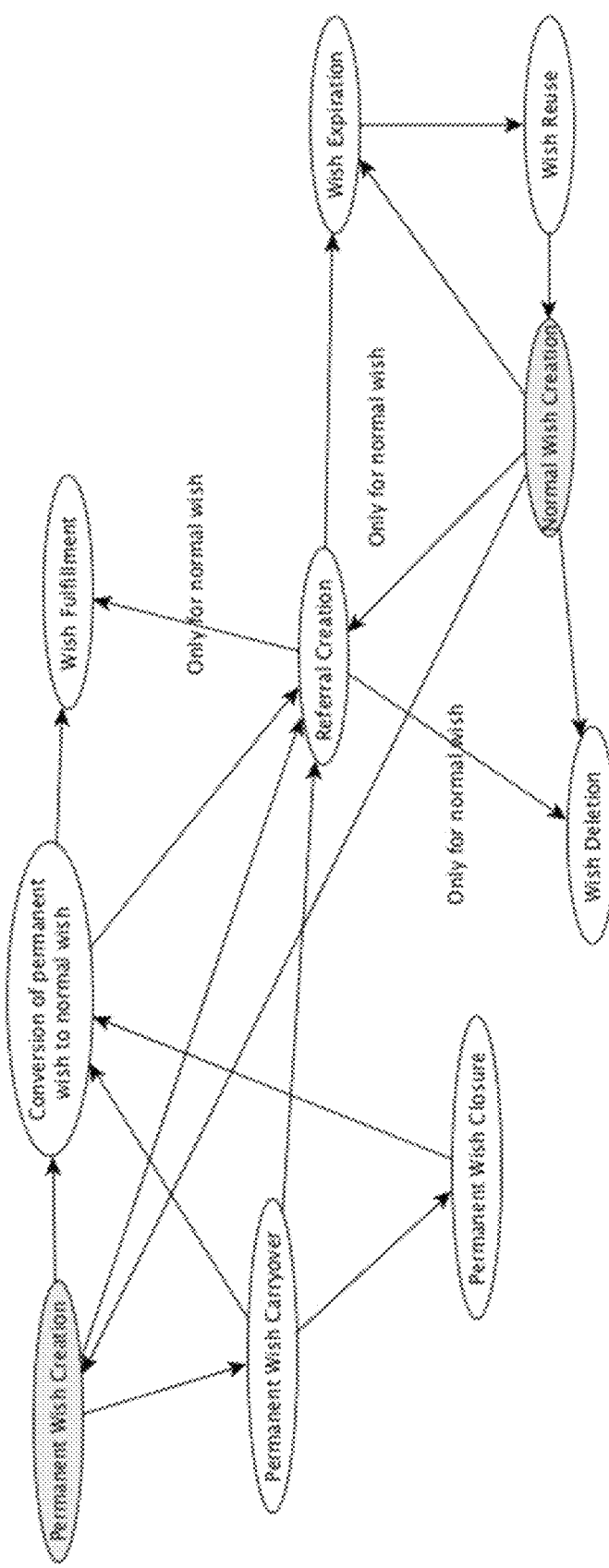
FIG. 8 depicts a state diagram for wishes according to an embodiment of the invention. Wishes can be "normal" and expire after a defined period of time or "permanent" and remain until action is taken to delete the wish (e.g., a user request, administrator action, closure of user's account, and the like). Wishes can be converted between "normal" and "permanent" and vice versa, e.g., based on changes in the user's account status. The lifecycle of a wish (permanent or normal) begins with creation and can end with wish fulfillment, wish expiration, or wish deletion. In one embodiment, users can opt between several subscriptions such as "Free" (in which a user can create three wishes at any time), "Premium" (in which a user can create six wishes, one of which can be permanent), and "Ultra Premium" (in which a user can create nine wishes, three of which can be permanent).

Referring now to FIG. 6, another embodiment of the invention provides a computer-implemented method of displaying which users a particular user have been most helpful to or received the most help from the particular user over a defined time period. The bar graph 602 depicted in FIG. 6 differs from conventional bar graphs by ordering the outbound assistance (shown as positive values on the y-axis) and the inbound assistance (shown as negative values on the y-axis) in opposing order such that the users having the highest magnitude (Nithin for outbound assistance and Rachel for inbound assistance) appear at or near the center of the categories (along the x-axis in the depicted embodiment, but other axes are possible) with the remaining categories in descending order as one moves away from the adjacent peaks. This places the data having the most extreme value at or near the center of the graph, thereby allowing the user to more easily recognize users having the greatest impact and allowing the user to better appreciate any asymmetries that may exist in help provided or received.

The chart can be created from either a data set having both positive and negative data values or two related data sets (e.g., representing inflows and outflows of favors, money, securities, commodities, and other values). In the latter case, the opposite data sets can be ordered separately. In the former case, a single set can be separated into at least a positive subset and a negative subset, which can each be ordered. In some embodiments, the values having 0 (or values below a defined threshold) are omitted.

Implementation in Computer-Readable Media and/or Hardware

The methods described herein can be readily implemented in software that can be stored in computer-readable media for execution by a computer processor. For example, the computer-readable media can be volatile memory (e.g., random access memory and the like) and/or non-volatile memory (e.g., read-only memory, hard disks, floppy disks, magnetic tape, optical discs, paper tape, punch cards, and the like).

Additionally or alternatively, the methods described herein can be implemented in computer hardware such as an application-specific integrated circuit (ASIC).

Meeting Manager

Figure 10:
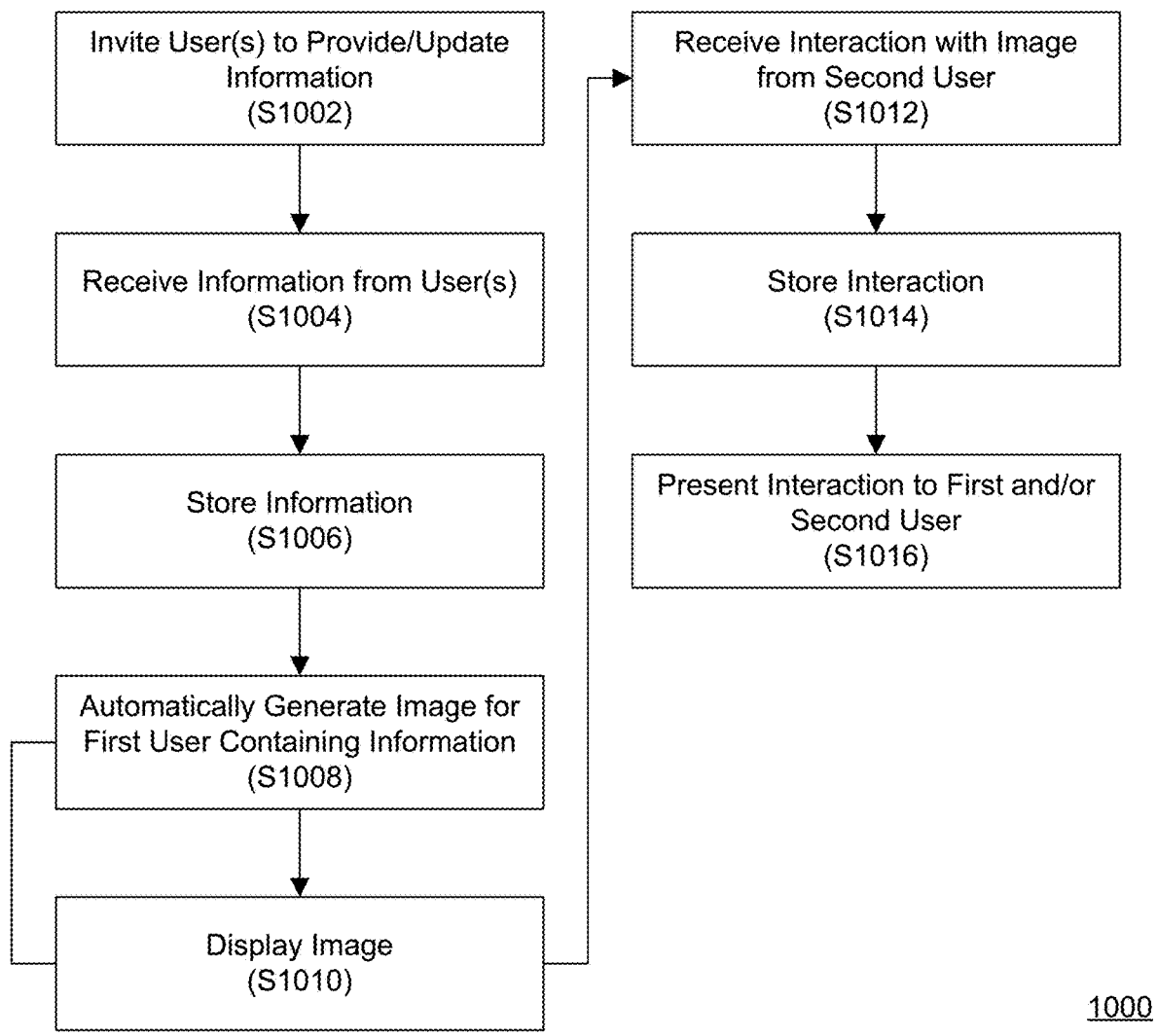
FIG. 10 depicts a computer-implemented method 1000 of facilitating introductions according to an embodiment of the invention.

Referring now to FIG. 10, another aspect of the invention provides a computer-implemented method 1000 of facilitating introductions. Such a method 1000 can be utilized to enhance meetings of a variety of types, whether in-person or virtual, such as networking events offered by groups such as chambers of commerce, professional organizations, and the like.

In step S1002, one or more users can be invited to provide and/or update information (e.g., name, profession, geographic location, interests, wishes, and the like). The invitation can be targeted to users that have previously registered for the event. The invitation can be distributed through a social networking service such as that available under the TREBLE® mark from Treble LLC of Baltimore, Md., a networking association, an alumni organization, and the like. In some embodiments, the requested information may be part of the user's profile within the social network and no updates may be required.

In step S1004, information can be received from the user. The information can be received at any time. In some embodiments, the information is received prior to the event. In other embodiments, the information can be received during the event. For example, late-registering or information-providing users can submit information while steps S1008 and/or S1010 are performed for other users.

In step S1006, the information can be stored, e.g., in memory and/or disk. In some embodiments, the information is stored as part of the user's profile (e.g., in a database).

In step S1008, an image containing at least a subset of the information provided by the user can be generated. The information can be automatically and/or dynamically generated so that no human input is required and so that the user can submit and/or update information at least up until performance of steps S1008 and/or S1010. The image can be in the format of a slide (e.g., similar to the size and formatting produced by presentation software available under the MICROSOFT® POWERPOINT® mark from Microsoft Corporation of Redmond, Wash., the KEYNOTE® mark from Apple Inc. of Cupertino, Calif., or the PREZI® mark from Prezi, Inc. of San Francisco, Calif.), a smartphone (e.g., devices sold under the IPHONE® trademark by Apple, Inc. of Cupertino, Calif., the WINDOWS® trademark by Microsoft Corporation of Redmond Wash., the ANDROID® trademark by Google Inc. of Mountain View, Calif., and the like), a tablet (e.g., devices sold under the IPAD® trademark from Apple Inc. of Cupertino, Calif. and the KINDLE® trademark from Amazon Technologies, LLC of Reno, Nev. and devices that utilize WINDOWS® operating systems available from Microsoft Corporation of Redmond, Wash. or ANDROID® operating systems available from Google Inc. of Mountain View, Calif.), a video game console (e.g., the WII U® console available from Nintendo of America Inc. of Redmond, Wash.; the SONY® PLAYSTATION® console available from Kabushiki Kaisha Sony Corporation of Tokyo, Japan; the MICROSOFT® XBOX® console available from Microsoft Corporation of Redmond, Wash.), a home media receiver (e.g., devices sold under the APPLE TV® trademark from Apple Inc. of Cupertino, Calif.) and the like.

In step S1010, the image is displayed. The image can be displayed using a digital projector, display device (e.g., monitor, television), and the like. The image can also be displayed over the Internet (e.g., using conferencing service such as those available under the GOTO® mark from LogMeIn, Inc. of Boston, Mass., the ZOOM™ mark from Zoom Video Communications, Inc. of San Jose, Calif., and the like).

In step S1012, an interaction from a second user can be received. For example, the second user can click, check a box, type or enter notes, interact with another GUI widget, and the like to indicate interest in a first user.

In step S1014, the interaction can be stored, e.g., in memory and/or disk. In some embodiments, the information is stored in a database.

In step S1016, the first user information and/or the second user interactions can be presented to the users. In one embodiment, an identical packet can be provided to all users. In other embodiments, a personalized packet is generated for each of the users, which can include that particular second user's comments on the other users, only include those users in whom the second user expressed interest, and the like. For the sake of clarity, Applicant notes that any particular user may act as both a first user (when submitting and sharing information) and a second user (when receiving information shared and/or presented by other users).

PROPHETIC EXAMPLES

Referring now to Table 1 below, embodiments of the invention can provide various tabular and/or graphical representations of the relative value of various parties.

TABLE 1

EXAMPLE TABULAR REPRESENTATION OF VALUE PROVIDED BY PARTIES

| CONTACT | INDUSTRY | EMAILS | MEETINGS | OTHER | NET ROI SCORE | RELATIONSHIP RATING (GOLD ETC.) |
|---|---|---|---|---|---|---|
| Contact B | Attorney | 19 | 5 | 1 | +5 | Gold |
| Contact C | Marketing | 14 | 2 | 4 | −3 | Bronze |

TABLE 1-continued

EXAMPLE TABULAR REPRESENTATION OF
VALUE PROVIDED BY PARTIES

| CONTACT | INDUSTRY | EMAILS | MEETINGS | OTHER | NET ROI SCORE | RELATIONSHIP RATING (GOLD ETC.) |
|---|---|---|---|---|---|---|
| Contact A | Business Development | 22 | 10 | 0 | +10 | Platinum |
| Contact E | Sales | 25 | 3 | 5 | −1 | Bronze |
| Contact D | Accounting | 31 | 0 | 0 | −10 | Tin |

Value weightings for various activities can be pre-assigned and/or can be assigned by a user and/or an organization. The user can manipulate the depiction to show the top or bottom n contacts (wherein n is an integer), activities occurring within a defined period (e.g., within the last month), within a geographic region, within an industry, and the like. The user can also filter or sort the display in decreasing or increasing order based on values in one or more fields.

Figure 3:
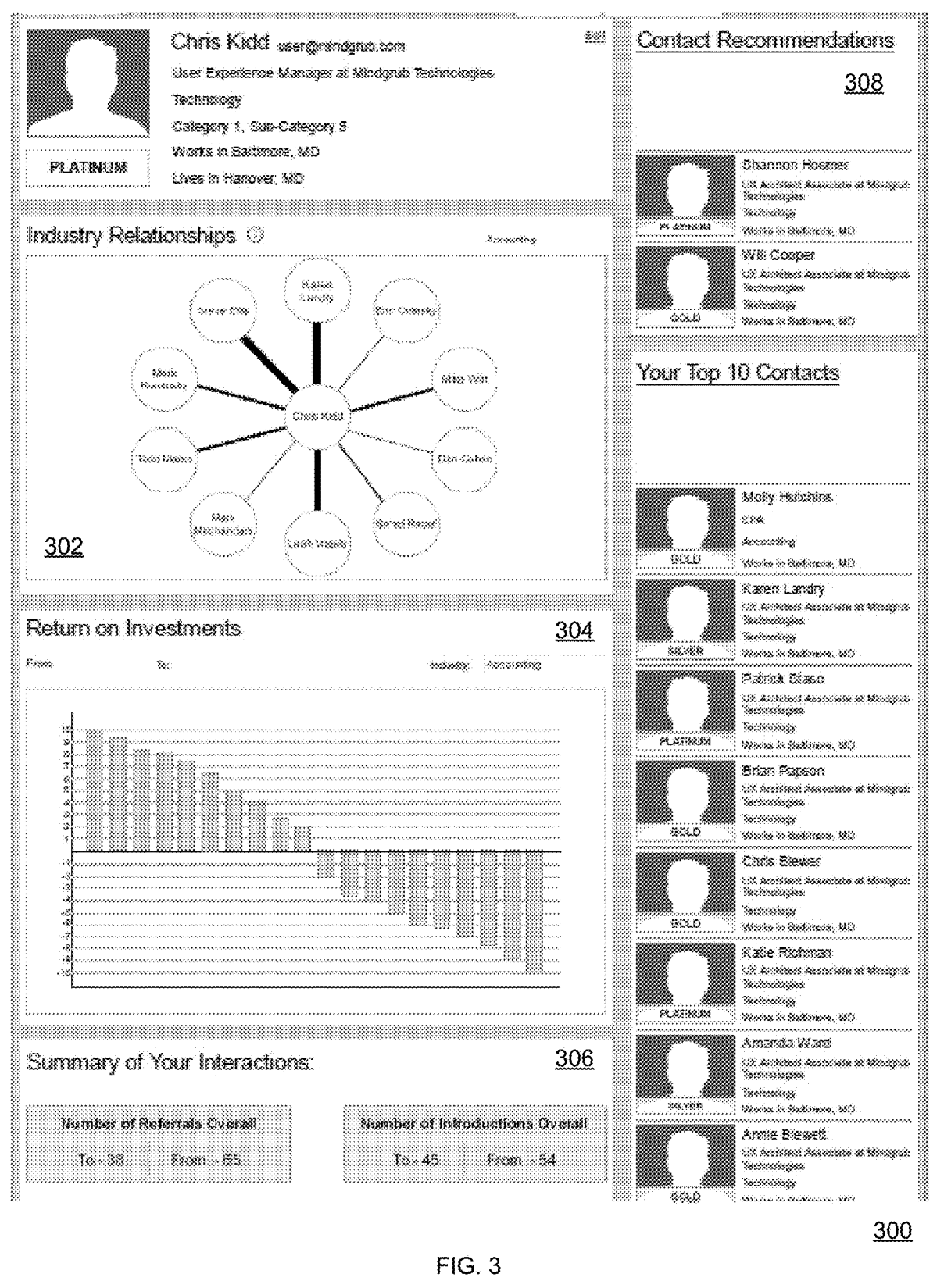

Referring now to FIG. 3, an exemplary dashboard graphical user interface 300 is depicted. The dashboard GUI 300 can include a network graph 302 representing the strength of connections to n connections (e.g., through thickness and/or color of link lines). The dashboard GUI 300 can also include a bar graph 304 depicting the user's return on investments within her network as a whole or within a particular industry. The dashboard GUI 300 can also include one or more summaries 306 of interactions such as the number of inbound and/or outbound referrals and/or introductions. The dashboard GUI 300 can also include one or more recommended contacts 308, e.g., based on analysis of the user's network and inbound and outbound activities to identify one or more users having substantially complimentary activities.

Figure 4:
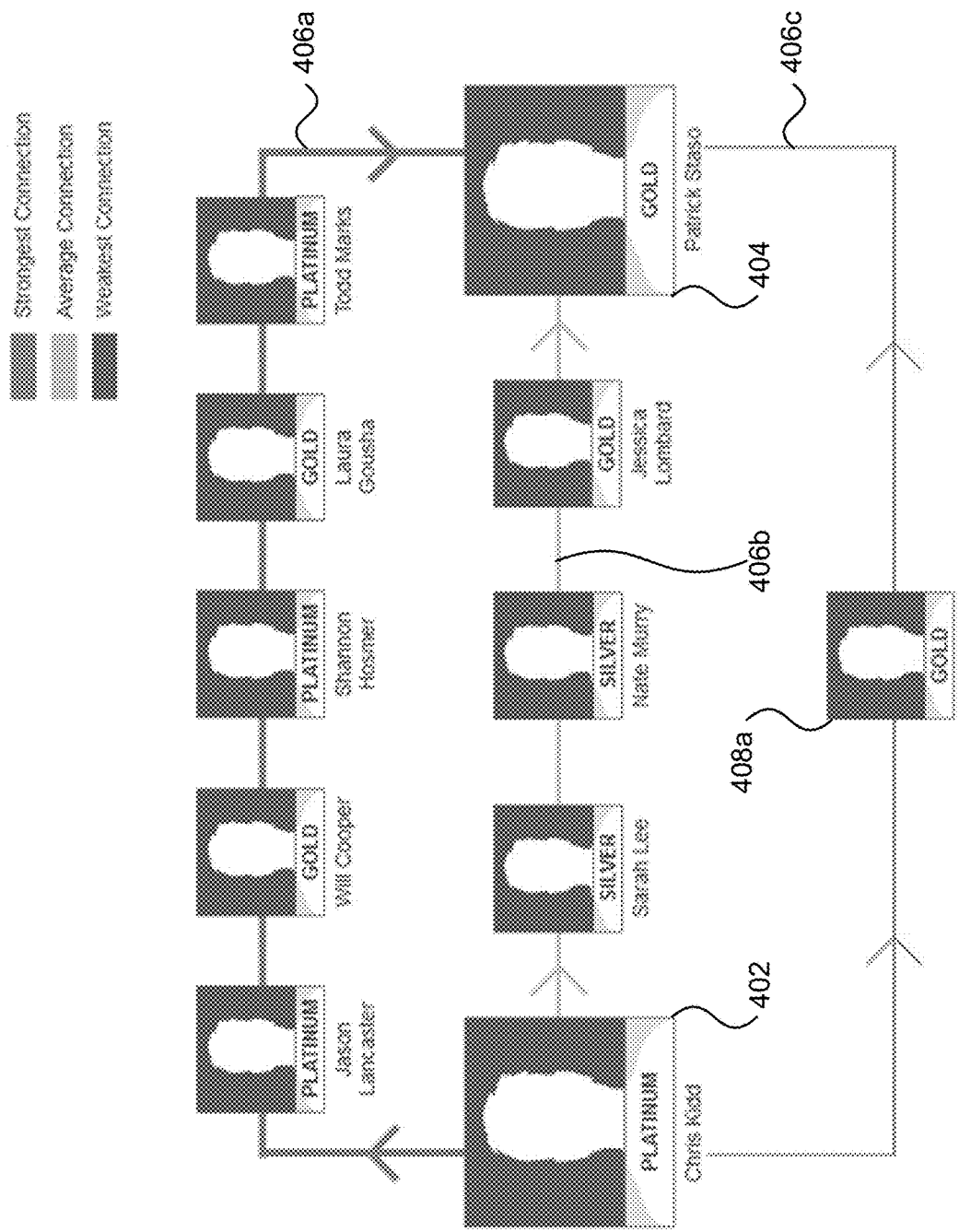
FIG. 4 depicts a path of connection graphical user interface (GUI) according to an embodiment of the invention.

Referring now to FIG. 4, an exemplary path of connection graphical user interface 400 is depicted. A first user 402 ("Chris Kidd") seeking an introduction or other connection to a second user 404 ("Patrick Staso") can be presented with one or more potential paths of connection 406a-c. The paths 406a-c can be weighted based on the strength of relationship (e.g., measured in terms of the number of favors given and received between adjacent users) and/or the number of links. For example, although path 406c is the shortest path in terms of required links (2), it can be depicted as relatively weak (e.g., through the color red or relatively thin link lines) due to the relatively weak relationship between first user 402 and/or second user 404 with respect to intermediate user 408a relative to the relationships with the users along path 406a.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A computer-implemented method of suggesting connections within a social networking service, the computer-implemented method comprising:
  receiving information from a plurality of users of the social networking service regarding favors performed by or bestowed upon the plurality of users, the information including:
    a user-defined appraisal of a value of each of the favors;
    a grantor category describing a grantor of each favor; and
    a grantee category describing a grantee of each favor;
  calculating sums of values for each of the grantor categories and the grantee categories for one or more of the users of the social networking service;
  applying a decay factor that decreases the sums of values for the grantor category for one or more of the users of the social networking service; and
  identifying one or more users of the social networking service in a different category having a complementary profile.

* * * * *